United States Patent [19]

Chen

[11] Patent Number: 5,697,262

[45] Date of Patent: Dec. 16, 1997

[54] QUICK-RELEASE PEDAL

[76] Inventor: Chung-I Chen, No. 3, Kung-Chi Rd., Yu-Ssi-Kung-Yeh Dist., Ta-Chia Chen, Taichung Hsien, Taiwan

[21] Appl. No.: 713,124

[22] Filed: Sep. 16, 1996

[51] Int. Cl.$^6$ ............................... B62M 3/08; G05G 1/14
[52] U.S. Cl. ............................................................ 74/594.6
[58] Field of Search ............................ 74/594.6, 594.4; 36/131

[56] References Cited

U.S. PATENT DOCUMENTS

| | | |
|---|---|---|
| 4,932,287 | 6/1990 | Ramos . |
| 5,003,841 | 4/1991 | Nagano ................... 74/594.4 |
| 5,048,369 | 9/1991 | Chen . |
| 5,115,692 | 5/1992 | Nagano . |
| 5,195,397 | 3/1993 | Nagano ................... 74/594.4 |
| 5,203,229 | 4/1993 | Chen . |
| 5,259,270 | 11/1993 | Lin . |
| 5,419,218 | 5/1995 | Romano . |
| 5,423,233 | 6/1995 | Peyre et al. . |
| 5,522,282 | 6/1996 | Nagano ................... 74/594.6 |
| 5,557,985 | 9/1996 | Nagano . |

Primary Examiner—Rodney H. Bonck
Assistant Examiner—Mary Ann Battista
Attorney, Agent, or Firm—Dickinson, Wright, Moon, Van Dusen & Freeman

[57] ABSTRACT

A quick-release pedal comprises a pedal body and a pair of retaining units. The pedal body includes a frame portion, a tubular portion and two receiving spaces within the frame portion. A pair of cleat engaging members are respectively provided on upper and lower sides of the tubular member. Each of the cleat engaging members has a claw portion and two fingers of different lengths. Each of the retaining units has first and second hook units, a pair of torsional springs and a pivot pin which is connected to the frame portion through a respective one of the receiving spaces. Each of the first and second hook units has pivot seats connected pivotably to a corresponding one of the pivot pins. Each of the first hook units has a hook section with a tongue which is opposed to the pivot seats. Each of the second hook units has an abutting section which is located behind the tongue. The torsional springs urge the first and second hook units to abut against the fingers of the cleat engaging members. The abutting section and the tongue of each of the first and second hook units are spaced from one another by a predetermined distance.

4 Claims, 5 Drawing Sheets

QUICK-RELEASE PEDAL

BACKGROUND OF THE INVENTION

1. Field of the Invention

This invention relates to a quick-release pedal, more particularly to a quick-release pedal which can engage a cleat that is secured to a cyclist's shoe by means of a manual effort or force which is smaller than that required to disengage the quick-release pedal from the cleat.

2. Description of the Related Art

The improvement of the present invention is directed to a conventional quick-release pedal which is disclosed in U.S. Pat. No. 5,203,229, issued on Apr. 20, 1993, and owned by the applicant. The above-cited device has two sides which are adapted to engage releasably a cleat which is secured on a cyclist's shoe and has a pedal body which includes a frame portion and a tubular portion. The pedal body further has a pair of cleat engaging members respectively provided on upper and lower sides of the tubular portion and respectively having a claw portion to receive releasably the first engaging part of the cleat, and a pair of retaining units revertably engaging the second part of the cleat. Each of the retaining units includes a pair of hook units and a pair of spring members which urge the hook units to engage the second part of the cleat. To achieve a firm engagement of the cleat and the retaining units, a large retaining force of the hook units which results from the biasing force of the spring members are exerted on the second part of the cleat. Therefore, a large manual effort or force is required to engage the cleat and the retaining units.

SUMMARY OF THE INVENTION

It is therefore a main object of the present invention to provide a quick-release pedal which can engage a cleat by means of a manual effort or force which is smaller than that required to disengage the quick-release pedal from the cleat. According to the present invention, the quick-release pedal comprises a pedal body and a pair of retaining units.

The pedal body includes a frame portion and a tubular portion which partitions the frame portion in a transverse direction to form two receiving spaces within the frame portion. The frame portion has front and rear ends. The tubular portion has a pair of cleat engaging members respectively provided on upper and lower sides thereof. Each of the cleat engaging members has a claw portion formed on the front end thereof and first and second fingers which extend rearward from the rear end thereof. Each of the second fingers is longer than a corresponding one of the first fingers.

The retaining units are mounted respectively in the receiving spaces of the pedal body. Each of the retaining units has first and second hook units, a pair of torsional springs and a pivot pin which is connected to the frame portion through a respective one of the receiving spaces and which is parallel to the tubular portion. Each of the first hook units has a first plate-like section, two opposed pivot seats which extend from the left and right edges near the lower edge of the first plate-like section and which are connected pivotably to a corresponding one of the pivot pins, a hook section extending from the upper edge of the first plate-like section, and a tongue extending transversely from the hook section. Each of the second hook units has a second plate-like section, two opposed pivot seats which extend from the left and right edges adjacent to the lower edge of the second plate-like section and which are connected pivotably to the corresponding one of the pivot pins, and an abutting section which is located behind and aligned with the tongue of a respective one of the first hook units. The torsional springs of each of the retaining units are mounted respectively between the pivot seats of the first and second hook units and are passed through by the respective one of the pivot pins so as to urge the upper edges of the first and second plate-like sections of each of the retaining units to abut against respectively the first and second fingers of a respective one of the cleat engaging members. The hook section of each of the first hook units is located over the first finger of the respective one of the cleat engaging members. The abutting section of each of the second hook units and the tongue of each of the first hook units are spaced from one another by a predetermined distance. When a cleat engages one of the cleat engaging members, a rear end of the cleat engages and pushes the hook section of one of the first hook units to move rearward by the predetermined distance against the spring force of a corresponding one of the torsional springs in order to permit the tongue of the hook section to contact the abutting section of a corresponding one of the second hook units. When the cleat is rotated relative to the pedal body so as to disengage a front end of the cleat from the claw portion of the one of the cleat engaging members, the rear end of the cleat pushes the hook section of the first hook unit and the abutting section of a corresponding second hook unit rearward against the spring force of the torsional springs associated with the first and second hook units in order to allow a lateral disengagement of the cleat from the pedal body.

BRIEF DESCRIPTION OF THE DRAWINGS

Other features and advantages of this invention will become apparent in the following detailed description of a preferred embodiment of this invention with reference to the accompanying drawings, in which.

DETAILED DESCRIPTION OF THE PREFERRED EMBODIMENT

Figure 1:
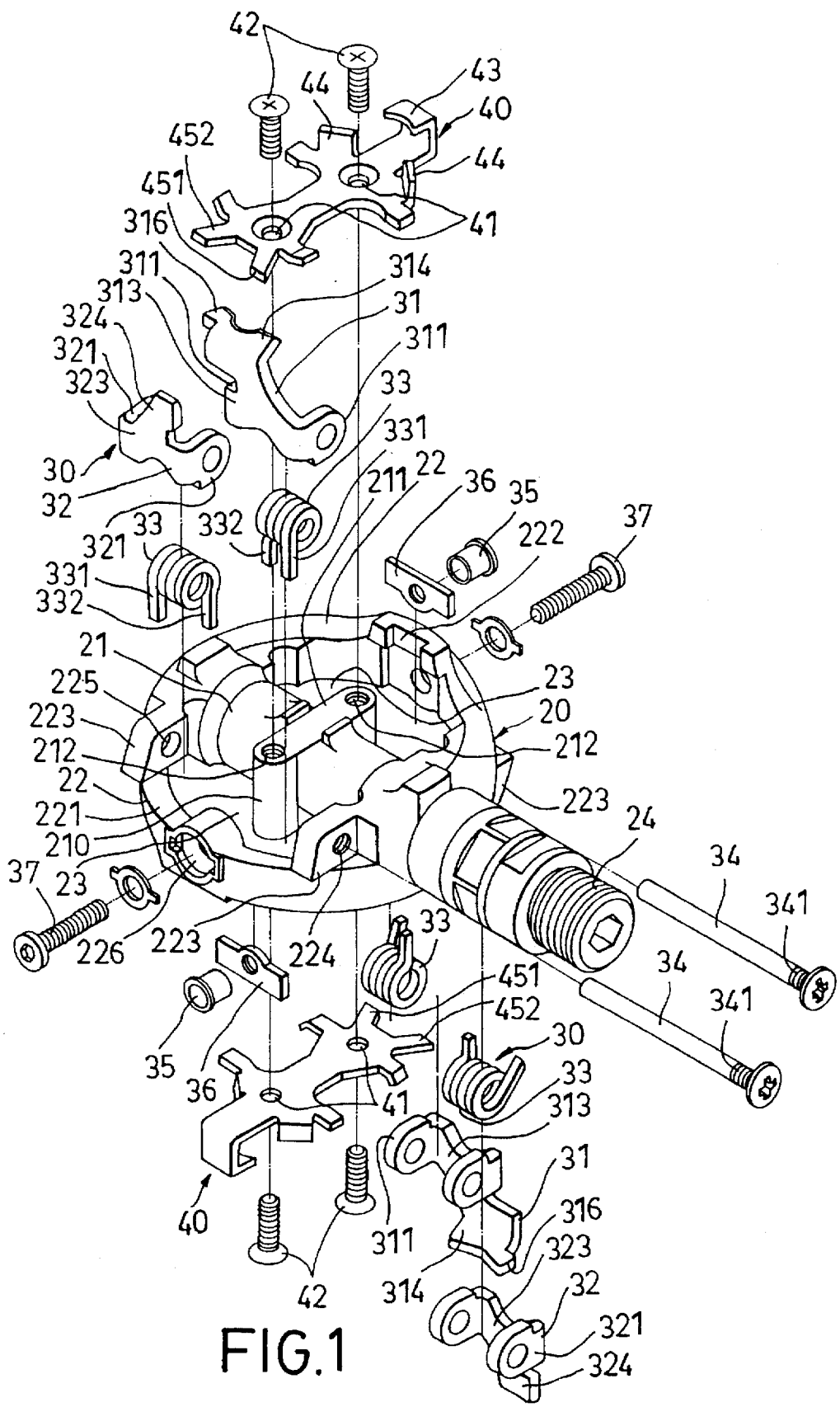
FIG. 1 is an exploded view of a preferred embodiment of a quick-release pedal according to the present invention.
Figure 2:
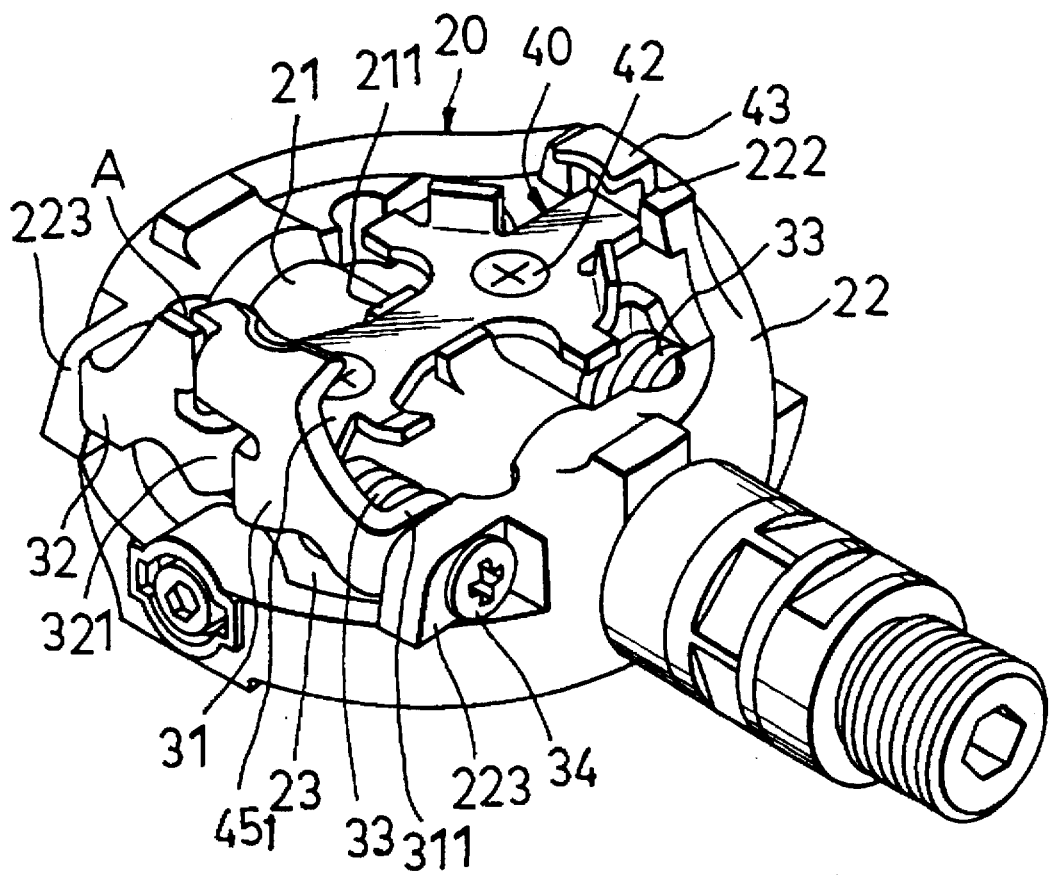
FIG. 2 is a perspective view of the preferred embodiment of the quick-release pedal according to the present invention.

Referring to FIGS. 1 and 2, a preferred embodiment of a quick-release pedal according to the present invention is shown to comprise a pedal body 20, a pair of retaining units 30 and two cleat engaging members 40.

The pedal body 20 is an integrally formed piece and includes a circular frame portion 22 and a tubular portion 21 which partitions the frame portion 22 in a transverse direction to form two receiving spaces 23 within the frame portion 22. The frame portion 22 has front and rear ends which are respectively formed with an indented frame part 221. The internal face of each of the indented frame parts 221 has a receiving cavity 222. Each of the indented frame parts 221 has a central through hole 226, opposed first and second lugs 223 adjacent to two ends thereof, and a threaded hole 224 and a hole 225 formed respectively through the first and second lugs 223. The threaded hole 224 and the hole 225 are aligned with one another.

The tubular portion 21 receives one end of a conventional pedal shaft 24 and has a central connector block 210 formed thereon. The connector block 210 has a pair of engaging grooves 211 respectively formed on upper and lower sides thereof. The connector block 210 is formed with two pairs of screw holes 212 (only one pair is shown). Each of the cleat engaging members 40 is mounted in one of the engaging grooves 211 by means of two screws 42 which extend respectively through the holes 41 in a corresponding one of the cleat engaging members 40 and which engage the screw holes 212. Each of the cleat engaging members 40 has a claw portion 43 formed on the front end thereof, two upright abutting members 44 formed near the claw portion 43, and first and second fingers 451, 452 which extend rearward from the rear end thereof. Each of the claw portions 43 is fitted in a respective one of the receiving cavities 222 of the frame portion 22 when the cleat engaging members 40 are mounted in the engaging grooves 211. Each of the second fingers 452 is longer than a corresponding one of the first fingers 451.

Figure 3:
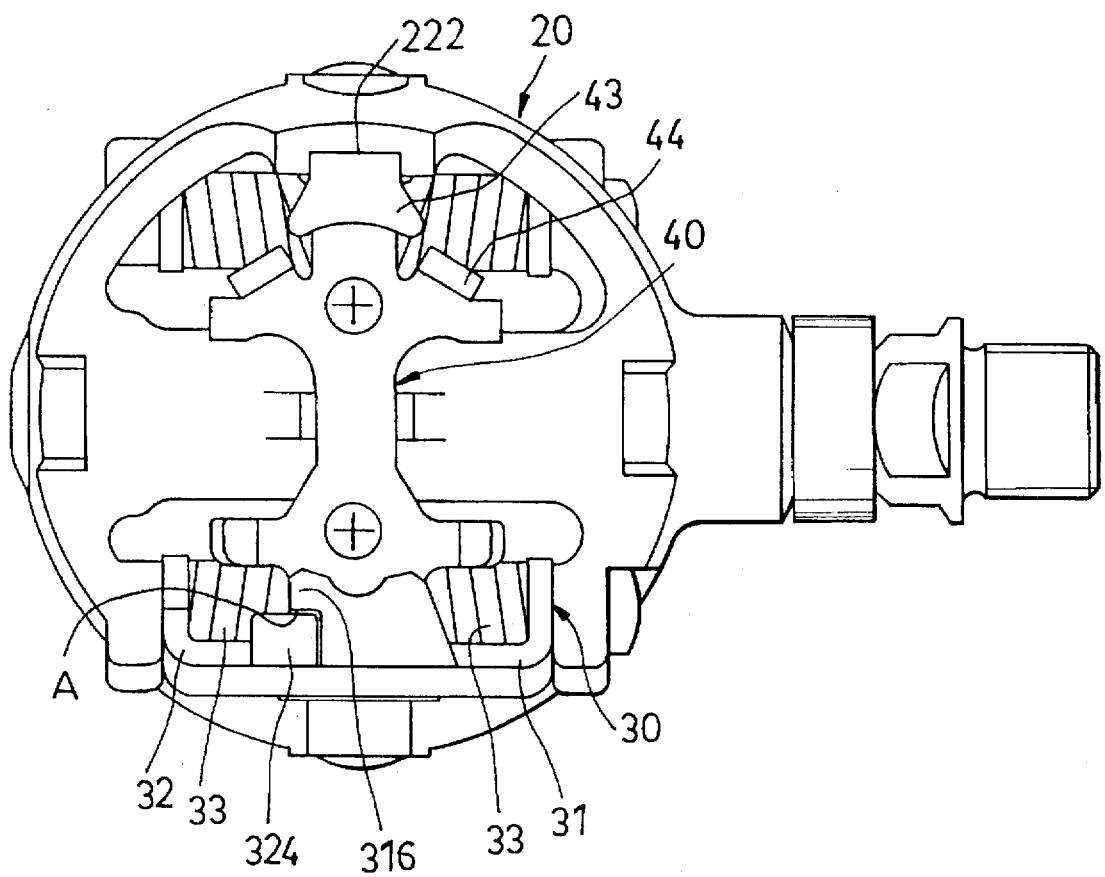
FIG. 3 is a top view of the quick-release pedal of FIG. 2.

The retaining units 30 are mounted respectively in the receiving spaces 23 of the pedal body 20. Each of the retaining units 30 has first and second hook units 31, 32, a pair of torsional springs 33 and a pivot pin 34 which is connected to the frame portion 22 through a respective one of the receiving spaces 23 and which is parallel to the tubular portion 21. More specifically, each of the pivot pins 34 has a threaded section 341 formed near one end thereof and extends through the threaded hole 224 and the hole 225 in the first and second lugs 223 of a respective one of the front and rear ends of the frame portion 22. The threaded sections 341 of the pivot pins 34 engage the threaded holes 224 in the first lugs 223. Each of the first hook units 31 has a first plate-like section 313, two opposed pivot seats 311 which extend from the left and right edges near the lower edge of the first plate-like section 313 and which are connected pivotably to a corresponding one of the pivot pins 34, a hook section 314 extending from the upper edge of the first plate-like section 313, and a tongue 316 extending transversely from the hook section 314. Each of the second hook units 32 has a second plate-like section 323, two opposed pivot seats 321 which extend from the left and right edges adjacent to the lower edge of the second plate-like section 323 and which are connected pivotably to the corresponding one of the pivot pins 34, and an abutting section 324 which is located behind and aligned with the tongue 314 of a respective one of the first hook units 31, as best illustrated in FIGS. 2 and 3.

The torsional springs 33 of each of the retaining units 30 are mounted respectively between the pivot seats 311, 321 of the first and second hook units 31, 32 and are passed through by the respective one of the pivot pins 34 so as to urge the upper edges of the first and second plate-like sections 313, 323 of each of the retaining units 30 to abut respectively against the first and second fingers 451, 452 of a respective one of the cleat engaging members 40. The hook section 314 of each of the first hook units 31 is located over the first finger 451 of the respective one of the cleat engaging members 40. The abutting section 324 of each of the second hook units 32 and the tongue 316 of each of the first hook units 31 are spaced from one another by a predetermined distance (A).

Figure 4:
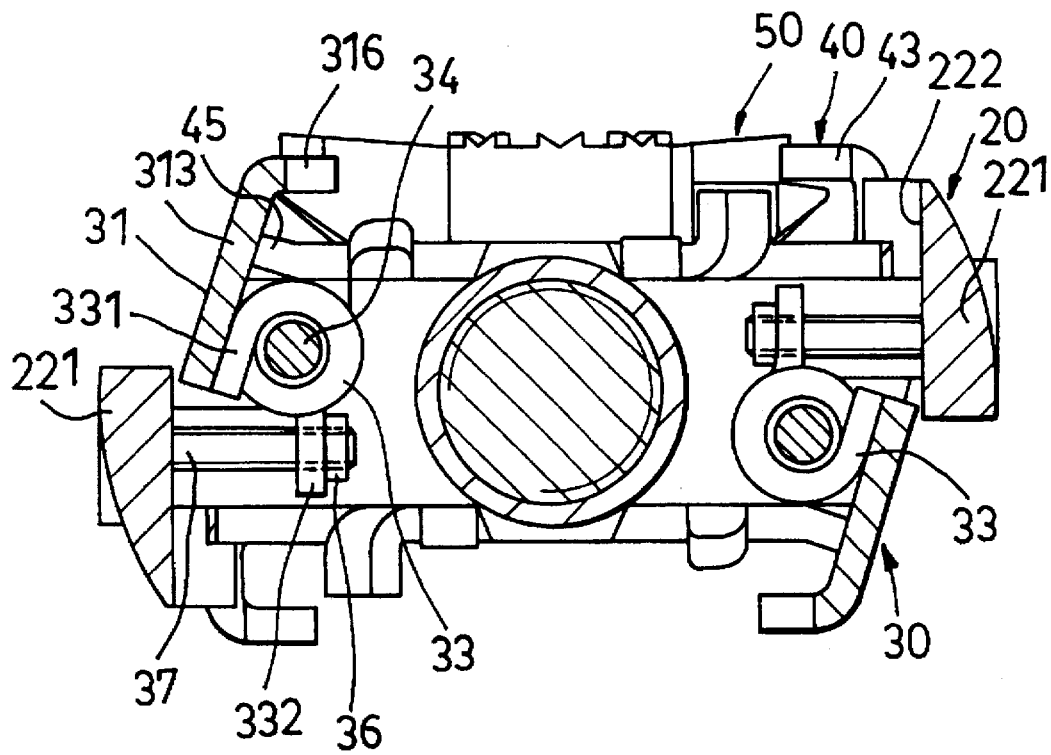
FIG. 4 is a cross sectional view of the quick-release pedal which engages a cleat in accordance with the present invention.

Referring to FIGS. 1 and 4, each of the frame parts 221 of the frame portion 22 further has a bolt 37 which extends the through hole 226, a tubular spacer 35 and which engages a nut member 36 which is disposed adjacent to the tubular portion 21. The torsional springs 33 of each of the retaining units 30 have first ends 331 which abut respectively against internal faces of the first and second plate-like sections 313 and 323 near the lower edges of the same and second ends 332 which abut against a respective one of the nut members 36. Each of the bolts 37 is operable so as to adjust the distance between the bolt 37 and a corresponding one of the front and rear ends of the frame portion 22 and vary the torsional force of the torsional springs 36.

Figure 5:
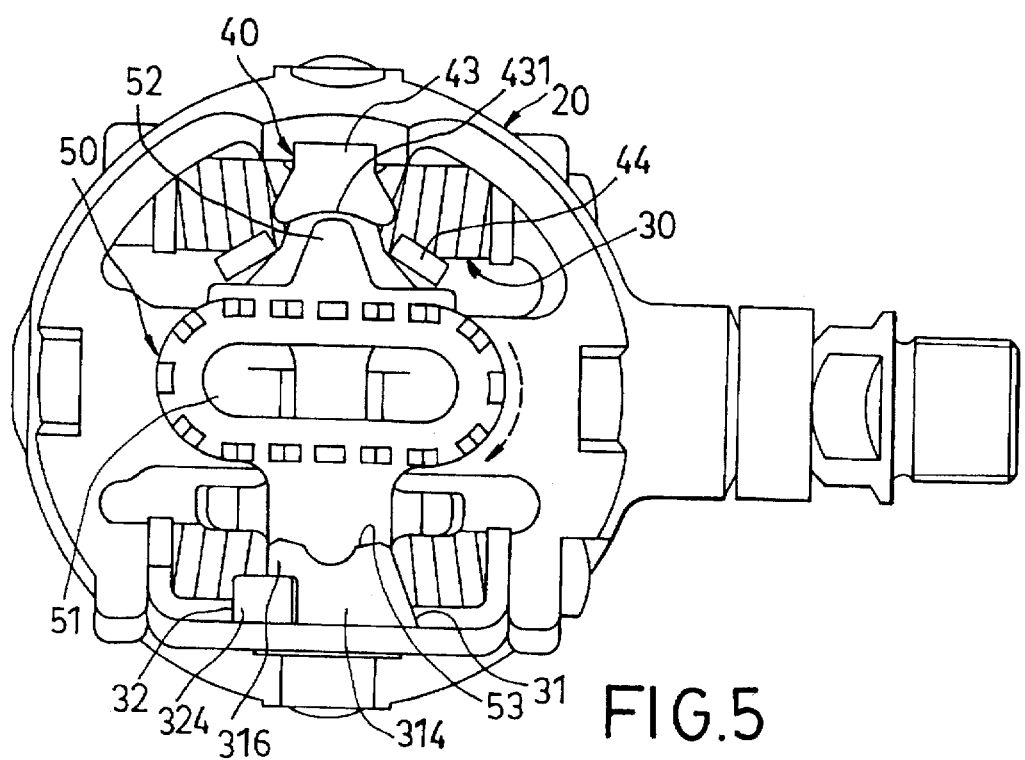
FIG. 5 is a top view of the quick-release pedal which engages the cleat in accordance with the present invention.
Figure 6:
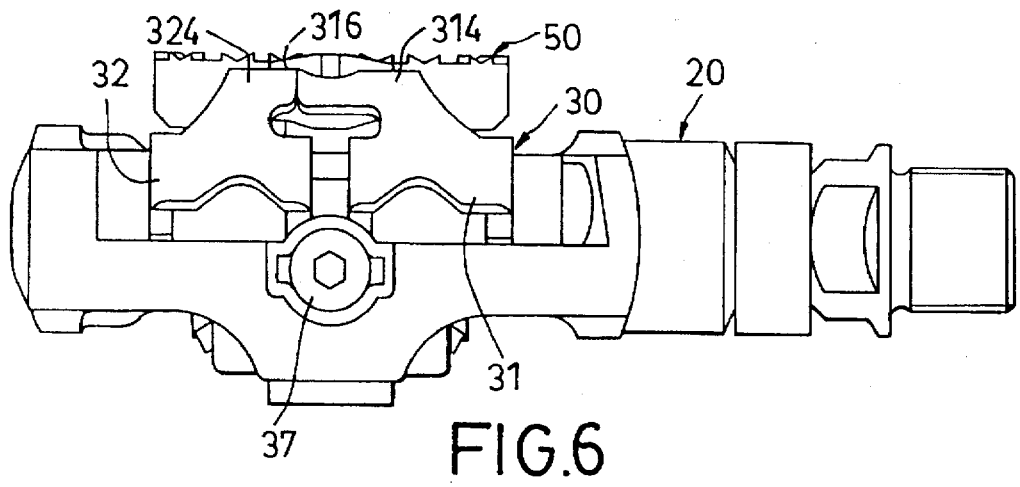
FIG. 6 is a side view of the quick-release pedal of FIG. 5.

FIGS. 4, 5 and 6 illustrate a cleat 50 which engages the preferred embodiment of the quick-release pedal of this invention. The cleat 50 is adapted to be fastened to a cyclist's shoe (not shown) in a known manner. When engaging the cleat 50 and the pedal body 20, the front end 52 of the cleat 50 is maneuvered so as to engage the claw portion 43 of a corresponding one of the cleat engaging members 40. The rear end 53 of the cleat 50 pushes the hook section 314 of one of the first hook units 31 to move rearward by the predetermined distance (A) until the rear end 53 of the cleat 50 moves past and engages the hook section 314 against the spring force of a corresponding one of the torsional springs 33. At this time, the tongue 316 of the hook section 314 contacts the abutting section 324 of a corresponding one of the second hook units 32 but is not biased by the other one of the torsional spring 33 which is associated with the second hook unit 32.

Removal of the cleat 50 from the pedal body 20 is done by rotating the cleat 50 relative to the latter so as to disengage the front end 52 of the cleat 50 from the claw portion 43 of the one of the cleat engaging members 40. Rotation of the cleat 50 causes the rear end 53 of the cleat 50 to push the hook section 314 of the first hook unit 31 and the abutting section 316 of a corresponding second hook unit 32 rearward, thereby causing the first and second hook units 31, 32 to pivot about the pivot pin 34 and compress the torsional springs 33 associated with the first and second hook units 31, 32 in order to allow a lateral disengagement of the cleat 50 from the pedal body 20. Removal of the cleat 50 from the pedal body 20 causes the torsional springs 33 to expand and return the first and second hook units 31, 32 to the respective original positions.

Note that, when engaging the cleat 50 and the pedal body 20, the cyclist has to overcome only the spring force of one of the torsional spring which is associated with one of the first hook units 31. However, the cyclist has to overcome the sum of the spring forces of the torsional springs 33 which are associated with the first and second hook units 31, 32 in order to disengage the cleat 50 from the pedal body 20. Therefore, the object of the present invention can be achieved.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangement.

I claim:
1. A quick-release pedal comprising:
   a pedal body including a frame portion and a tubular portion which partitions said frame portion in a transverse direction to form two receiving spaces within said frame portion, said frame portion having front and rear ends, said tubular portion having a pair of cleat engaging members respectively provided on upper and lower sides thereof, each of said cleat engaging members having a claw portion formed on a front end thereof and first and second fingers extending rearward from a rear end thereof, each of said second fingers being longer than a corresponding one of said first fingers; and a pair of retaining units mounted respectively in said receiving spaces of said pedal body, each of said retaining units having first and second hook units, a pair of torsional springs and a pivot pin which is connected to said frame portion through a respective one of said receiving spaces and which is parallel to said tubular portion, each of said first hook units having a first plate-like section with upper, lower, left and right edges, two opposed pivot seats which extend from said left and right edges adjacent to said lower edge of said first plate-like section and which are connected pivotably to a corresponding one of said pivot pins, a hook section extending from said upper edge of said first plate-like section, and a tongue extending transversely from said hook section, each of said second hook units having a second plate-like section with upper, lower, left and right edges, two opposed pivot seats which extend from said left and right edges adjacent to said lower edge of said second plate-like section and which are connected pivotably to the corresponding one of said pivot pins, and an abutting section which is located behind and aligned with said tongue of a respective one of said first hook units, said torsional springs of each of said retaining units being mounted respectively between said pivot seats of said first and second hook units and being passed through by the respective one of said pivot pins so as to urge said upper edges of said first and second plate-like sections of each of said retaining units to abut respectively against said first and second fingers of a respective one of said cleat engaging members, said hook section of each of said first hook units being located over said first finger of the respective one of said cleat engaging members, said abutting section of each of said second hook units and said tongue of each of said first hook units being spaced from one another by a predetermined distance;

whereby when a cleat engages one of said cleat engaging members, a rear end of said cleat engages and pushes said hook section of one of said first hook units to move rearward by said predetermined distance against spring force of a corresponding one of said torsional springs in order to permit said tongue of said hook section to contact said abutting section of a corresponding one of said second hook units, and whereby when said cleat is rotated relative to said pedal body so as to disengage a front end of said cleat from said claw portion of said one of said cleat engaging members, said rear end of said cleat pushes said hook section of said first hook unit and said abutting section of a corresponding second hook unit rearward against the spring force of said torsional springs associated with said first and second hook units in order to allow a lateral disengagement of said cleat from said pedal body.

2. The quick-release pedal as claimed in claim 1, wherein said tubular portion has a central connector block formed thereon, said connector block having a pair of engaging grooves respectively formed on upper and lower sides of said connector block, each of said cleat engaging members being mounted in one of said engaging grooves.

3. The quick-release pedal as claimed in claim 1, wherein each of said front and rear ends of said frame portion has a through hole formed therein, a bolt extending said through hole, and a nut member engaging said bolt adjacent to said tubular portion, said torsional springs of each of said retaining units having first ends which abut respectively against internal faces of said first and second plate-like sections near said lower edges of said first and second plate-like sections and having second ends which abut against a respective one of said nut members, each of said bolts being operable so as to adjust distance between said bolt and a corresponding one of said front and rear ends of said frame portion and vary the spring force of said torsional springs.

4. The quick-release pedal as claimed in claim 1, wherein each of said front and rear ends of said frame portion has an indented frame part, opposed first and second lugs, and a threaded hole and a hole formed respectively through said first and second lugs, said threaded hole and said hole being aligned with one another, each of said pivot pins having a threaded section formed near one end thereof and extending through said threaded hole and said hole in said first and second lugs of a respective one of said front and rear ends of said frame portion with said threaded section engaging said threaded hole.

* * * * *